United States Patent [19]

Kowel et al.

[11] Patent Number: 4,572,616

[45] Date of Patent: Feb. 25, 1986

[54] ADAPTIVE LIQUID CRYSTAL LENS

[75] Inventors: Stephen T. Kowel, Syracuse; Philipp G. Kornreich, No. Syracuse; Dennis S. Cleverly, Utica, all of N.Y.

[73] Assignee: Syracuse University, Syracuse, N.Y.

[21] Appl. No.: 406,871

[22] Filed: Aug. 10, 1982

[51] Int. Cl.⁴ ............................................. G02F 1/133
[52] U.S. Cl. ................................. 350/335; 350/347 V; 350/393
[58] Field of Search .................... 350/347 V, 335, 336, 350/380, 162.16, 413, 379, 393

[56] References Cited

U.S. PATENT DOCUMENTS

| | | | |
|---|---|---|---|
| 3,040,625 | 6/1962 | Zito | 350/380 |
| 3,312,519 | 4/1967 | Max | 350/162.16 |
| 3,424,513 | 1/1969 | Lotspeich | 350/336 X |
| 3,700,306 | 10/1972 | Cartmell | 350/341 |
| 3,751,137 | 8/1973 | Fitzgibbons et al. | 350/344 |
| 3,981,559 | 9/1976 | Channin | 350/336 |
| 4,037,929 | 7/1977 | Bricot et al. | 350/347 V |
| 4,054,362 | 10/1977 | Baues | 350/347 V |
| 4,124,273 | 11/1978 | Huignard | 350/393 X |
| 4,190,330 | 2/1980 | Berreman | 350/335 X |
| 4,222,641 | 9/1980 | Stolov | 350/331 R X |
| 4,251,141 | 2/1981 | Stemme et al. | 350/336 X |
| 4,278,327 | 7/1981 | McMahon et al. | 350/347 V |
| 4,385,805 | 5/1983 | Channin | 350/347 V |
| 4,466,708 | 8/1984 | Nishimoto | 350/379 |

FOREIGN PATENT DOCUMENTS 2254057  11/1973  France ........................... 350/347 V

OTHER PUBLICATIONS

Stone et al., "Focusing Effects in Interferometric Analysis of Graded Index Optical Fibers", Applied Optics, vol. 14, No. 1, Jan. 1975, pp. 151-155.

Primary Examiner—John K. Corbin
Assistant Examiner—David Lewis
Attorney, Agent, or Firm—Bruns and Wall

[57] ABSTRACT

A liquid crystal adaptive lens system wherein the index of refraction profile of the liquid crystal is controlled electrically to bring entering light to focus.

8 Claims, 13 Drawing Figures

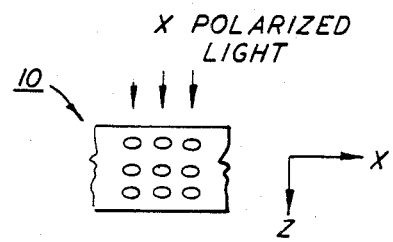
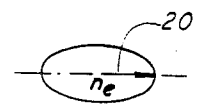
*FIG. 3a*     *FIG. 3b*
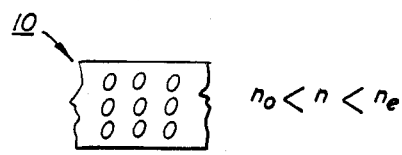
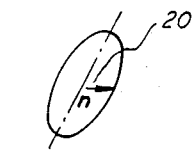
*FIG. 3c*     *FIG. 3d*
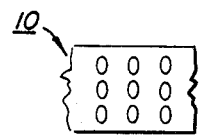
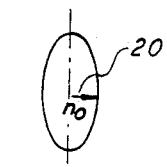
MOLECULE ALIGNMENT     INDICATRIX POSITION
*FIG. 3e*     *FIG. 3f*
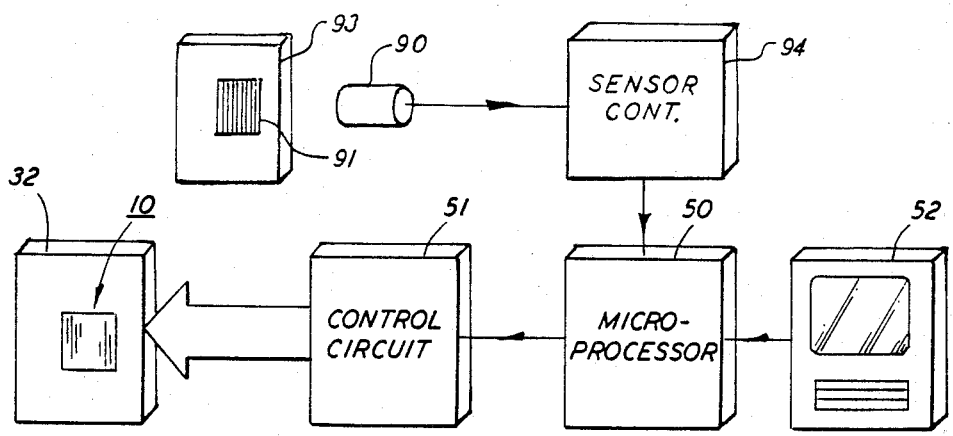
*FIG. 4*

ADAPTIVE LIQUID CRYSTAL LENS

BACKGROUND OF THE INVENTION

This invention relates to controlling the phase of light exiting a liquid crystal device and, in particular, to an adaptive liquid crystal lens that is controlled electrically.

Heretofore, most liquid crystal devices have been used for display purposes, as for example, in digital time pieces and the like. The device usually includes an electro-optical cell similar to that described in U.S. Pat. No. 3,977,767. The cell typically consists of a pair of spaced apart glass plates or windows, a series of transparent control electrodes in a seven electrode configuration that are disposed on the inside of the plates and a suitable liquid crystal material sandwiched between the electrodes that responds to a voltage applied to the electrodes. Usually, the cell is designed so that no image information is displayed when a voltage below the threshold voltage of the liquid crystal is applied to the electrodes. A voltage above the saturation voltage of the material is applied to selected electrodes which in turn changes the index of refraction of the material in the electrodes region to create a desired image pattern. The term threshold voltage, as herein used, refers to some initial electrode voltage at which the liquid crystal molecules start to react to an applied force field and begin to reorientate themselves in the field. Saturation, on the other hand, refers to a higher electrode voltage at which any molecule reorientation is substantially completed and any further increase in voltage produces little or no effect in the material.

It should be noted that the control electrodes in most display devices are arranged to operate at two levels. The first level is somewhere below threshold while the second is maintained between three and five times the threshold voltage. As a consequence, each electrode acts as an on-off switch to produce either an image or no image in the electrode region.

Lotspeich in U.S. Pat. No. 3,424,513 discloses an electro-optical lens wherein incoming light is caused to pass through a Kerr effect substance that is under the influence of at least one quadrapole control unit. The elongated electrodes of the unit are placed parallel to the optical axis of the lens and are electrically interconnected so that a variable control field is established with the Kerr effect material. Because of the quadrapole arrangement, an entering light beam can only be diverged by the lens with the amount of divergence being dependent upon the voltage applied to the electrodes. Normally, the control voltage must be about 20,000 volts in order to produce the desired effects. Because of the high voltages involved and the fact that the device by itself cannot act as a converging lens, the lens is of little or no practical value.

Bricot et al in U.S. Pat. No. 4,037,929 describes the use of a nematic liquid crystal to modify a glass lens. The glass lens consists of a plano element and a convex element between which the liquid crystal is stored. A first transparent solid area electrode is mounted on the inside surface of the flat element and a second similar type electrode is mounted on the inside surface of the convex element. As taught by Bricot et al, the voltage applied to the electrodes is varied between the threshold and saturation voltages of the liquid crystal to change the index of refraction thereof. By changing the index of refraction of the material the focal length of the glass lens can be modified within extremely narrow limits. The lens, however, suffers from all the defects common to glass lenses and because of the two electrode configurations, the lens is restricted to use in conjunction with incoming light that is polarized in one direction only.

SUMMARY OF THE INVENTION

It is an object of the present invention to improve adaptive lenses in general.

A further object of the present invention is to produce an electronically controlled lens from a simple liquid crystal cell by selectively varying the index of refraction of the liquid crystal across the cell whereby the lens response approaches that of thin lens.

Another object of the present invention is to provide a liquid crystal lens whose index of refraction is electrically controlled point to point on the lens to provide for near diffraction limited performance.

A still further object of the present invention is to provide a liquid crystal lens that can be electrically corrected for both internal and external aberrations.

Yet another object of the present invention is to provide a liquid crystal adaptive lens that can focus arbitrarily polarized light electronically using a very low voltage drive and thus eliminating the need for mechanical linkages and the like.

These and other objects of the present invention are attained by means of a lens system having at least one electrooptical cell containing a pair of spaced apart flat plates, a plurality of spaced apart transparent electrodes disposed inside the plates, a liquid crystal material contained between the plates in the electroded region, and control means for varying the voltage applied to each of the electrodes to provide point to point control over the index of refraction of the material to bring incoming light to focus at a plane. In one form of the invention a plurality of cells are staged in series so that light polarized in any direction perpendicular to the axis of the cells is given the necessary phase transformation to provide a sharp clean image.

BRIEF DESCRIPTION OF THE DRAWINGS

For a better understanding of these and other objects of the present invention, reference is had to the following detailed description of the invention which is to be read in conjunction with the accompanying drawing, wherein:

FIGS. 3a–3f are schematic diagrams illustrating the orientation of positive liquid crystal molecules as the index of refraction of the material varies between the extraordinary index of refraction and the ordinary index of refraction;

FIG. 4 is a block diagram showing an address system for regulating the voltage applied to the control electrodes contained in the cell of FIG. 1;

DESCRIPTION OF THE INVENTION

Figure 1:
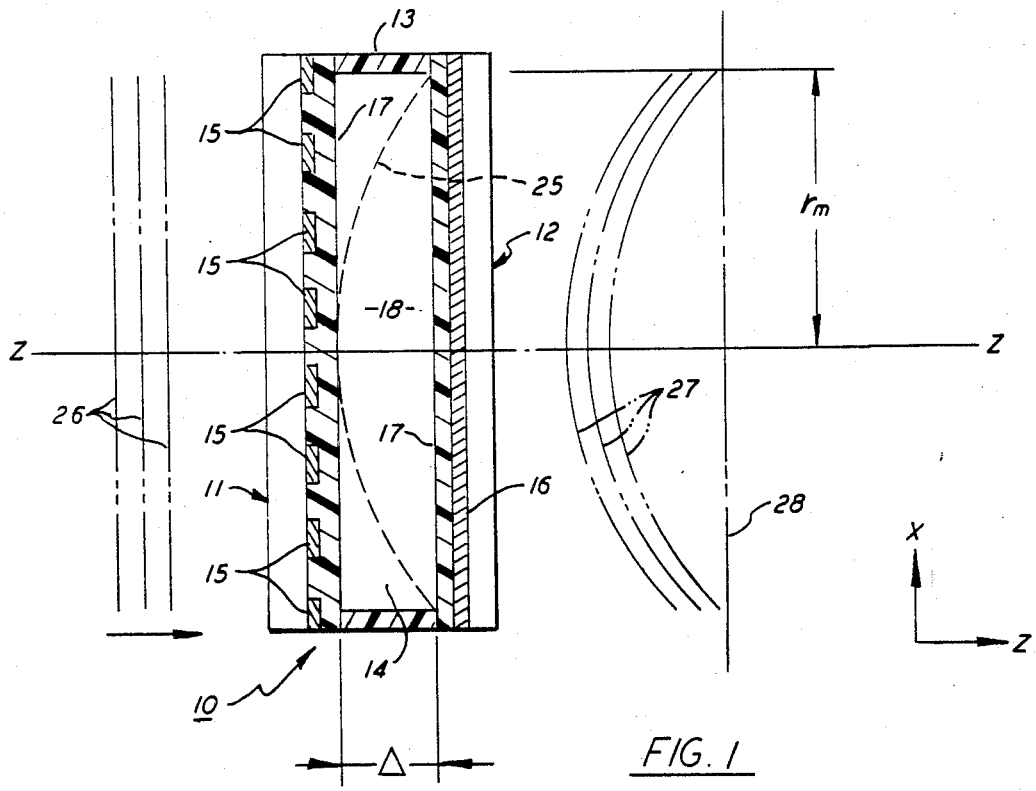
FIG. 1 is an enlarged side view in partial section of a cell embodying the teachings of the present invention.

A simple form of the invention is illustrated in FIG. 1, wherein the lens consists of a single cell 10 which is filled with a liquid crystal. As will be explained in greater detail below, the index of refraction of the liquid crystal is electrically controlled to bring a light beam entering the cell to focus and also to permit correction of the lens for both internal and external aberrations. The cell includes a square shaped front window 11 and a similarly shaped rear window 12 that are mounted in spaced apart parallel relationship by means of a frame 13. The frame is formed of Teflon and is sealed against the inside surfaces of the windows to establish a leak-proof chamber 14 therebetween in which a liquid crystal 18 is stored. The windows are made from optically clear glass so that light entering the cell is able to pass through the liquid crystal medium.

A series of linear transparent control electrodes 15—15 are disposed across the width of the front window in spaced apart parallel relationship. The space provided between electrodes is about equal to the width of the electrodes. Although not shown, the control electrodes are brought out of the cell and each electrode independently connected to an adjustable voltage supply whereby the voltage applied to each electrode may be selectively varied to establish a contoured force field within the cell. A transparent common electrode 16 covers the entire inside surface of the back window which cooperates with each of the control electrodes to complete the control circuitry. The electrodes are formed of indium-tin oxide or any other suitable material using well known filming and masking techniques. The surfaces of the electrodes that are exposed to the liquid crystal material are further coated with a thin film 17 of silicon dioxide which protects the electrodes from the liquid crystal without adversely affecting the operation of the electrodes.

The operation of the lens will be explained in reference to a positive nematic liquid crystal. It should be clear, however, to one skilled in the art that a negative liquid crystal may also be similarly employed without departing from the teachings of the invention. Nematic liquid crystals are uniaxial in that both the axis of the molecule and the optical axis are coincident. The material is said to be positive when the dielectric tensor component lying along the axis of the molecule is greater than the component positioned perpendicular to the axis. The molecules of a positive liquid crystal therefore tend to align themselves parallel to the direction of an applied force field while the opposite is true of a negative liquid crystal.

To construct a cell 10 that utilizes a positive liquid crystal and is capable of focusing incoming X-polarized light, the molecules of the material are first placed in a preferential alignment that is parallel to the window surfaces in the X-direction. Preferential alignment of the molecules is achieved by using well known rubbing techniques which causes the molecules to orientate themselves in the X-direction when no voltage is applied to the electrode.

FIGS. 3a–3f schematically illustrate the response of the molecules to variations in an applied field. When the voltage applied to an associated control electrode is below the reaction threshold voltage for the crystal material, the molecules remain in a homogenous state as illustrated at FIGS. 3a and 3b. At this time the molecules are in preferred alignment and the indicatrix 20 is at the extraordinary index of refraction ($n_e$) location. At some voltage between threshold and saturation, the molecules reorientate themselves at some intermediate position as shown at 3c and 3d and the indicatrix is now at a new position in reference to the cell axis. Finally, when the saturation voltage is reached, all the molecules theoretically are aligned with the field and the indicatrix is at the ordinary index of refraction ($n_o$) position. This condition is illustrated at FIGS. 3e and 3f. As previously noted, applying an increased voltage to the electrodes after saturation is reached has little or no affect on the liquid crystal. In practice, however, total alignment of the molecules is not attainable because of the conditions that exist at the boundaries of the windows. In practice, therefore, the value of the average index of refraction at saturation is always greater than the theoretical value.

Figure 2:
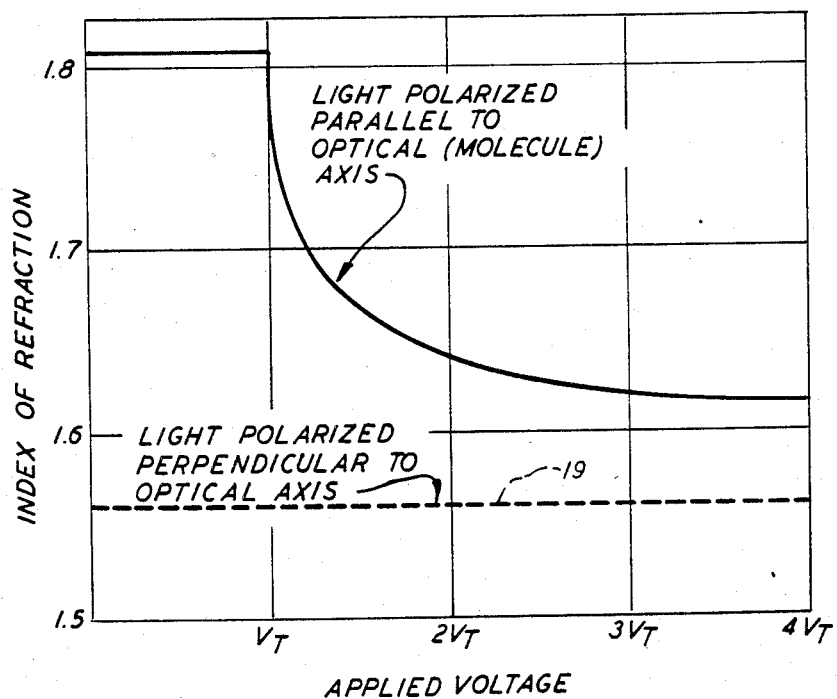
FIG. 2 is a response curve illustrating the change in the index of refraction of a specific liquid crystal used in the cell of FIG. 1 as a function of applied voltage.

Variations in the index of refraction of a given material for a given range of voltages can be found either experimentally or analytically. FIG. 2 illustrates the response curve for a cell of the type herein described that contains a well known liquid crystal MBBA (4-methoxybenzylidine -4'-n-buthylanaline) for which $n_e = 1.8062$ and $n_o = 1.5616$ at a wavelength $\lambda = 0.5145$ microns. It should be noted that saturation is reached at a voltage about four times threshold voltage. However, the average index of refraction value at saturation is slightly above the ordinary index of refraction for the material represented by the dashed line 19.

To provide the instant cell illustrated in FIG. 1 with thin lens performance characteristics, approaching plane waves 26—26 of X-polarized light entering the lens must be given the correct phase transformation to produce a cylindrical output wavefront 27—27 which is brought to focus at the image plane 28. Entering light polarized in the Y-direction undergoes a constant phase delay and is thus not influenced by the lens. Correct phase transformation is achieved by appropriately setting the voltages applied to each of the control electrodes so that the index of refraction across the cell varies smoothly as graphically depicted by the dotted line curve 25. Assuming that light passing through the cell suffers only a phase transformation and that the light rays are paraxial, thin lens approximations can be made for generating the desired smooth index of refraction profile.

To find the index of refraction at some point along the index profile to bring an incoming plane wave of light 26—26 to focus at a desired image plane 28, it can be assumed:

$$n(r) = A + Br^2 \tag{1}$$

where:
  A is the index of refraction of the modified wave along the Z axis;
  B is a constant; and r is the distance to any point measured from the the Z axis in an x-y plane For a positive liquid crystal an intermediate index of refraction (n) under the control of the applied field has the limits $$n_o < n \leq n_e \quad (2)$$

Thus the phase delay component lying along the Z axis (r=0) may be expressed as:

$$A = n_e \quad (3)$$

Substituting in (1) with $r = r_m$:
$$A + Br_m^2 = n_i \quad (4)$$

where:
n$_i$ is the maximum index of refraction at the outer periphery of the lens and
r$_m$ is the maximum distance to the periphery from the Z axis.

The B component can now be expressed in terms of the index of refraction as follows:

$$B = \frac{n_i - n_e}{r_m^2} \quad (5)$$

The corresponding phase transfer function is:

$$t(r) = \exp(jkn\Delta) \quad (6)$$

Substituting for n using equations (3) and (5):

$$t(r) = \exp\left[jk\Delta\left(n_e + \frac{n_i - n_e}{r_m^2} r^2\right)\right] \quad (7)$$

where:
r$_m$ is the distance from the Z-axis to the outside of the lens;
k is $2\pi/\lambda$ (wavelength);
$j^2$ is equal to $-1$.

Since $n_e > n_i$:
$\Delta$ is the thickness of the crystal layer $$t(r) = \exp(jk\Delta n_e) \exp\left(-jk\Delta \frac{n_e - n_i}{r_m^2} r^2\right) \quad (8)$$

Comparing the expression (8) with the standard expression for a thin lens:

$$t(r) = \exp(jk\Delta n) \exp\left(-j\frac{k}{2f} r^2\right) \quad (9)$$

the focal length of the lens is identified as:

$$\frac{1}{f} = 2\Delta \frac{(n_e - n_i)}{r_m^2} \quad (10)$$

By choosing voltages such that the index varies between $n_e$ and an intermediate value $n_i > n_o$, the focal length of the lens can be adjusted between infinity and a minimum value, namely:

$$\frac{1}{f_{min}} = 2\Delta \frac{(n_e - n_i)}{r_m^2} < 2\Delta \frac{(n_e - n_o)}{r_m^2} \quad (11)$$

A lens may now be constructed with the aid of equation (10) and index of refraction data from the response curve shown in FIG. 2. Given the desired focal length, cell thickness and distance of the various electrodes from the Z-axis, equation (10) can be used in conjunction with the response curve to provide a reading of the set of required voltages. Using well known microprocessor control techniques, the lens can be quickly and accurately focused and can also be corrected electrically to overcome the adverse affects of aberrations to provide for near diffraction limited performance.

Figure 6:
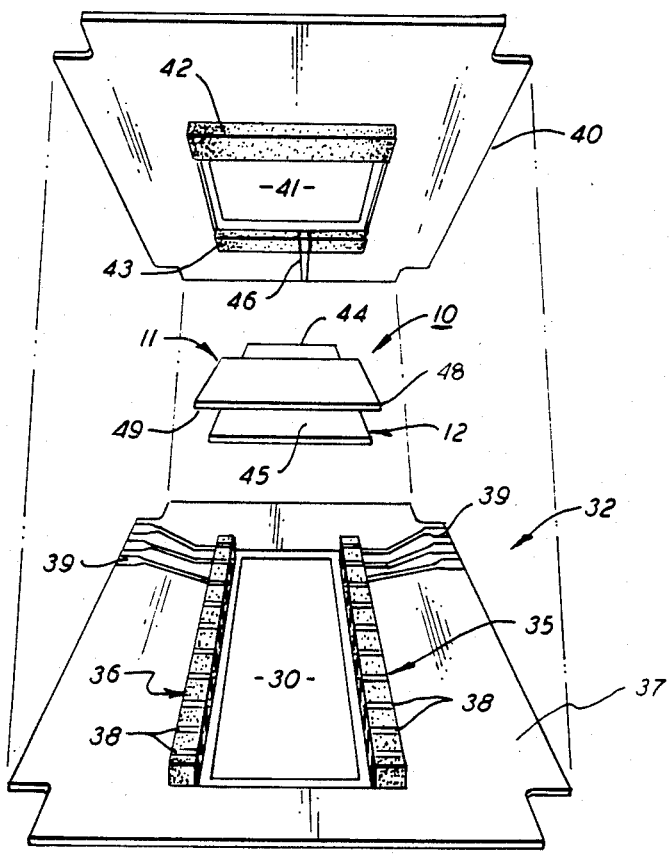
FIG. 6 is an exploded view in perspective showing an electrical package for containing a cell similar to that illustrated in FIG. 1.

The cell 10 is housed in a package generally referenced 32 (FIG. 6) which protects the cells and provides a means by which the control electrodes are connected to a voltage source. To better facilitate packaging, the plates forming the front and rear windows 11 and 12 are extended beyond the side margins of the cell to create a cruciform structure as shown in FIG. 6. The control electrodes are passed out of the chamber to either side thereof and are mounted in staggered rows on each of the extended aprons 48 and 49. The aprons 48 and 49 are seated, in assembly, upon two raised connector pads 35 and 36. The pads are mounted upon a printed circuit board 37 that forms the bottom section of the package. The pads are preferably "zebra" connectors having conductive graphite strips 38—38 embedded in a rubber base. In assembly, each strip is seated in contact with one of the control electrodes and serves to place the electrode in electrical communication with one of a series of terminals 39—39 printed along the side edges of the board. The pads cushion the extended aprons and resiliently support the cell over a centrally positioned opening 30.

The top section 40 of the package generally complements the bottom section. The top section also contains a central opening 41 having a pair of opposed resilient pads disposed along its upper and lower margins. The pads are adapted to seat in contact against the two extended aprons 44 and 45 of rear window 12 thus further securing the cell within the package. The top section of the package contains a single terminal 46 which is connected to the common electrode 16. In practice the common electrode may be placed at a desired operating level or is grounded. Any suitable closure device may be used to secure the sections in assembly.

As illustrated in FIG. 4, the electrode terminals of package 32 are connected to a microprocessor 50 through control circuit 51. Programmed data from the processor is used to place each of the electrodes at a predetermined voltage to develop the index of refraction profile needed to bring an incoming light wave to focus. An input terminal 52 can be operatively connected to the microprocessor to permit data stored in the processor to be upgraded or modified.

Figure 5:
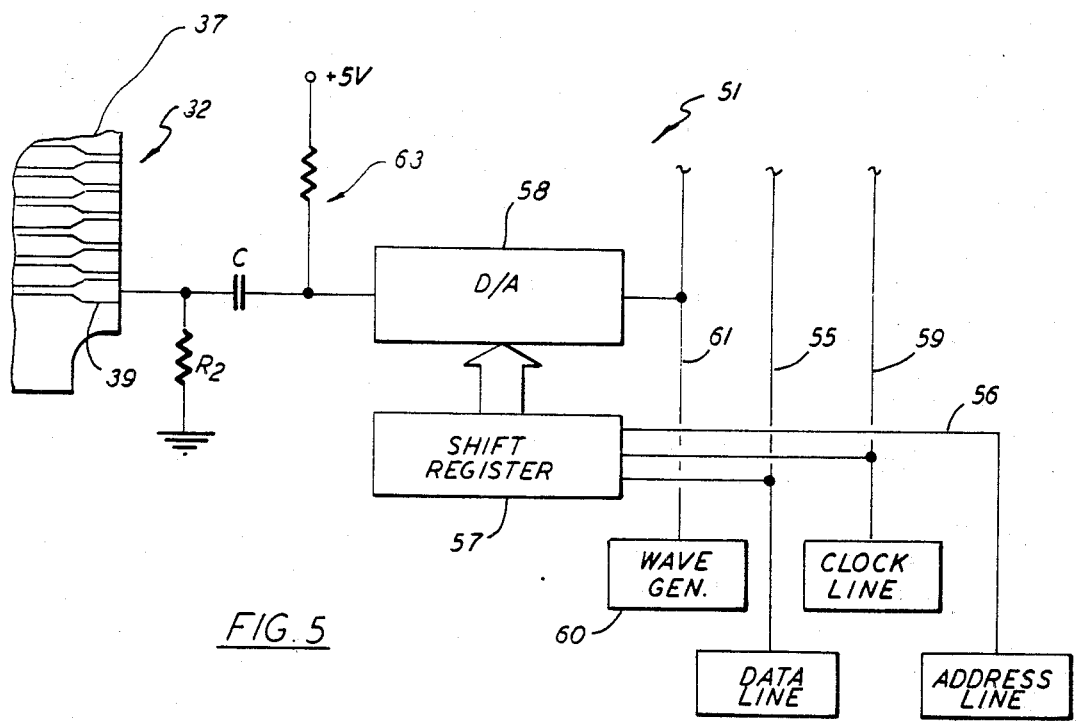
FIG. 5 is a circuit diagram showing circuitry for controlling the voltage applied to each of the control electrodes used in the cell of FIG. 1.

FIG. 5 illustrates control circuitry used to set each control electrode at a desired value. Each electrode terminal 39 printed on circuit board 37 is connected to a shift register 57 through a digital to analog converter 58 containing a multiplier (not shown). Digital information is forwarded from the processor via data line 55. An address line 56, which is coupled to the shift register, identifies the specific information that the register is to process. Once identified this information is entered into the register and temporarily stored therein. The stored data is passed on to the converter in response to a clock pulse signal provided by clock line 59. A square wave generator 60 is connected by line 61 to the converter and provides the necessary supply voltage to the electrode. The supply voltage input is combined with the shift register input in the multiplier circuit which, in turn, produces a voltage output that is adjusted to the desired level. The output from the converter is coupled to the electrode terminal through a capacitor-resistor network 63 which places the electrode voltage at some desired bias level.

As can be seen, the voltage applied to each electrode can now be independently maintained to provide point to point control over the index of refraction of the liquid crystal. Using well known microprocessing techniques, the index of refraction profile can be changed in response to corresponding spacial variations in the control field to change the focal length of the lens. Accordingly, the lens can be readily focused without the aid of mechanical linkages or the like. The lens also exhibits all the favorable characteristics of most liquid crystal devices in that it can be operated at extremely low voltages while consuming very little power.

Figure 7:
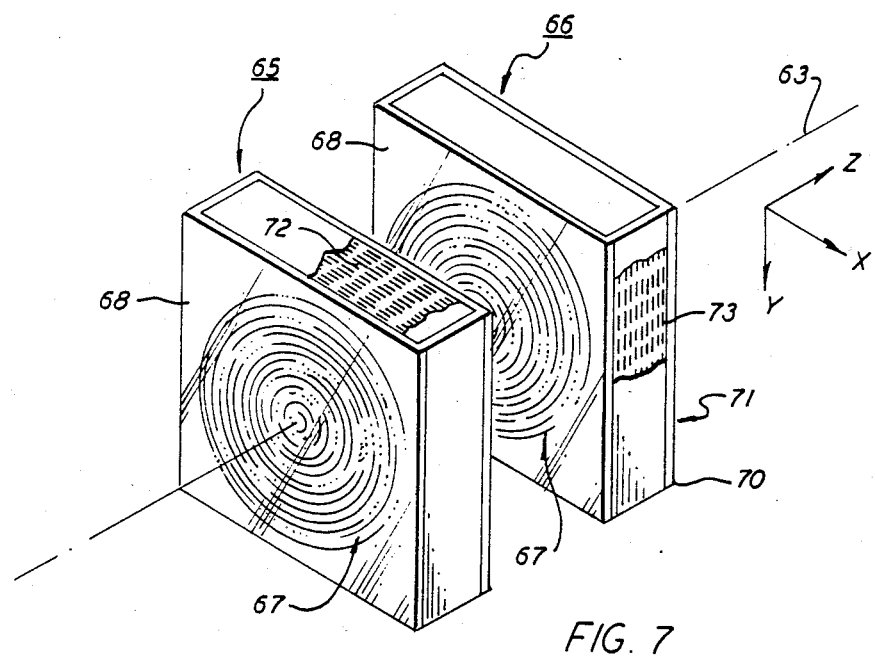
FIG. 7 is an enlarged perspective view showing a complete lens system having a pair of cells containing radially disposed symmetrical electrodes wherein the cells are staged so that arbitrarily polarized light entering the lens system is adapted electrically.

Ideally, the index of refraction profile generated by the lens should be spherical in order for the system to focus arbitrary polarized light entering the lens at a plane. This can be accomplished by the two stage lens system shown in FIG. 7 having a front cell 65 and a back cell 66 that are mounted in series along the axis 63 of the system. Each cell is constructed in the manner described above; however, the control electrodes 67 are configured on the front windows of the cells in a circular bullseye pattern centered upon the axis. Although shown exploded, it should be understood that the cells are packaged, in assembly, in abutting contact to form a single unit whereby light entering the front cell will exit the back without passing through another medium such as air.

The front cell is arranged to influence X-polarized light while the rear cell is arranged to influence Y-polarized light. This is achieved by rubbing the interior surfaces of the front cell so that the liquid crystal molecules, which are shown schematically at 72, are preferentially aligned in the X-direction. The surfaces of the rear cell are similarly rubbed to align the molecules along the Y-axis as illustrated at 73. Staging the cells as shown thus allows the index of refraction of the liquid crystal to be contoured electrically to produce a spherical lens response. Furthermore, the phase front of the lens system is electrically controlled to provide adaptive lens capabilities and to permit the lens to be corrected for aberrations and/or other lens defects.

Figure 8:
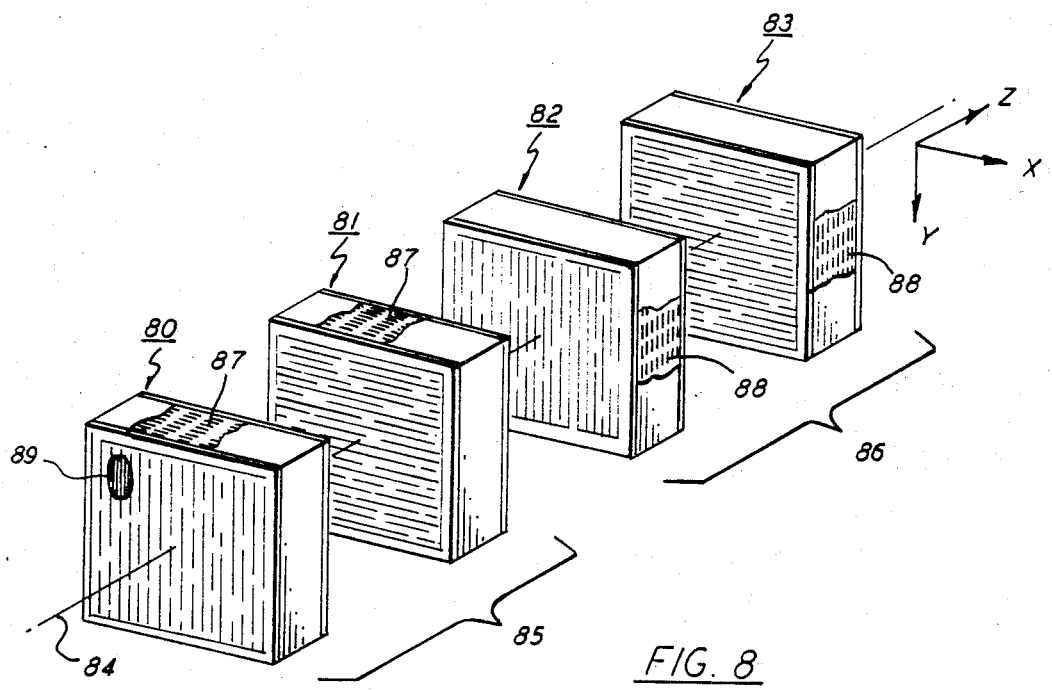
FIG. 8 is also an enlarged perspective view showing a lens system having four cells containing linear electrodes wherein the cells are staged so that randomly polarized light entering the lens system is adapted electrically.

A spherical lens capability can also be achieved by cascading four liquid crystal cells as shown in FIG. 8 wherein the electrodes contained in each cell are configured in linear rows rather than being symmetrical about the axis 84 of the system. In this embodiment, the front two cells 80 and 81 of the lens system form a first unit 85 that influences incoming X-polarized light. The two rear cells 82 and 83 form a second unit 86 that influences Y-polarized light. The first cell in each unit contains control electrodes that are disposed along the Y-axis while the electrodes of the second cell are disposed along the X-axis.

Each cell in the first unit 85 is rubbed to preferentially align the liquid crystal molecules 87—87 in the X-direction. The cells making up the second unit 86, on the other hand, are rubbed to preferentially align the liquid crystal molecules 88—88 in the Y-direction. As can be seen, the first unit is able to be electrically controlled to produce the desired phase transfer in X-polarized light while the second unit similarly influences Y-polarized light. The net result again is to produce a spherical lens capability. However, the use of linear electrodes avoids many of the masking and fabricating difficulties associated with symmetrical electrodes and also allows the electrodes to be connected to the input terminals without crossing the connectors over the electrodes.

Referring once again to FIG. 4, the liquid crystal device 10 of the present invention is further controlled electrically to correct for aberrations. This is achieved by adjusting the voltage applied to selected electrodes. A photoelectric sensor 90 is positioned so that it can view an image 91 created by the device at the image plane 93 of the lens 10. A signal from the sensor is delivered to a sensor controller 94 which compares the sensed image information with a predetermined optimum value. In the event the sensed image information is less than optimum, the controller, acting through the microprocessor, adjusts the voltage on the appropriate electrode or electrodes to bring the image to a desired operating level. Through use of the sensing system, the lens can be adapted to provide near diffraction limited performance.

It should be further noted that through use of the linear electrode arrangement shown in the lens system illustrated in FIG. 8, the device can be made to scan or translate electrically in a plane perpendicular to the axis 84 of the system using well known microprocessor techniques. It should be understood that in practice a relatively large number of electrodes per unit area of each cell are utilized in the present invention. The electrodes, and the spacing therebetween, may be on the order of between one and twenty microns wide which is well within the capability of present day technology. Accordingly, a lens can be created on a small region of the cell, as depicted at 89 in FIG. 8, and the lens electrically moved in both the X-direction and the Y-direction to either provide a scanning capability to the system or to translate the image as desired.

While this invention has been described with reference to the structure disclosed herein, it is not confined to the details set forth and this application is intended to cover any modifications or changes as may come within the scope of the following claims.

We claim:

1. An adaptive lens for focusing arbitrarily polarized light entering the system at an image plane that includes
   a pair of liquid crystal cells which are placed in series along an axis defining the axis of the lens,
   each of said cells having a pair of flat optically clear plates that are perpendicularly aligned with the lens axis, a liquid crystal housed between the plates and a series of radially disposed transparent control electrodes mounted upon one of the plates that are symmetrically positioned about the lens axis,
   a first of said cells having means associated therewith for preferentially aligning the liquid crystal housed therein in an X-direction,
   a second of said cells having means associated therewith for preferentially aligning the liquid crystal housed therein in a Y-direction,
   said two liquid crystal cells being arranged to influence light passing therethrough only with nematic material contained therein, and control means for selectively placing a predetermined voltage values on each of said control electrodes for contouring the index of refraction profile of the liquid crystal about the lens axis to obtain a spherical lens response for focusing arbitrarily polarized light at an image plane.

2. The lens of claim 1 wherein the two cells are mounted in abutting contact.

3. The lens of claim 1 wherein the control means further includes an adjusting means for selectively varying the voltage values on the individual electrodes.

4. The lens of claim 1 wherein said control means includes a processor for placing a predetermined voltage upon each of the control electrodes in response to a given program.

5. An adaptive lens having a central axis for controlling the phase of light passing through a dominant aperture of the lens that includes a first unit for influencing incoming light polarized in the X-direction that is centered upon the axis of the lens, a second unit for influencing incoming light polarized in the Y-direction that is centered upon the axis of the lens, each of said units containing a pair of liquid crystal cells, each cell further including a pair of flat optically clear plates, a nematic liquid crystal housed between the plates and a series of parallel aligned linear electrodes disposed within the cell, the first unit having means associated with each cell for preferentially aligning the liquid crystal molecules in the X-direction and the electrodes in one of said cells being disposed in the X-direction and the electrodes in the other cell being disposed in the Y-direction, the second unit having means associated with each of the cells for preferentially aligning the liquid crystal molecules in the Y-direction and the control electrodes contained in one of the cells being disposed in the X-direction add the control electrodes contained in the other of said cells being disposed in the Y-direction, and control means connected to each of the electrodes for selectively placing a predetermined voltage thereon for contouring the index of refraction profile of the liquid crystal about the axis of the lens to produce a spherical lens response for focusing arbitrarily polarized incoming light at a desired image plane.

6. The adaptive lens of claim 5 that further includes electrical means for adjusting the voltage value applied to individual electrodes to correct the lens.

7. The lens of claim 5 wherein the cells are mounted in abutting contact along the axis of the lens.

8. The lens of claim 5 wherein said control means further includes a processor for varying the voltage applied to each electrode in response to a given program.

* * * * *